Jan. 21, 1969 R. N. AUGER 3,422,666
PROXIMITY DETECTION DEVICE
Filed Dec. 21, 1967 Sheet 1 of 3
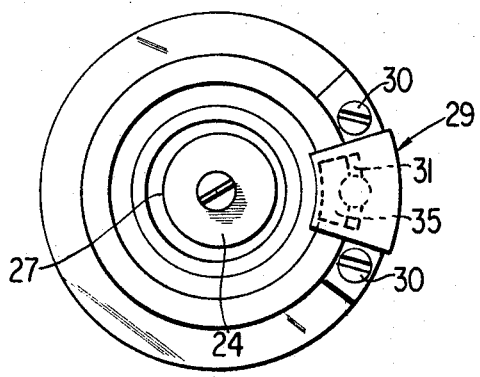
FIG. 2
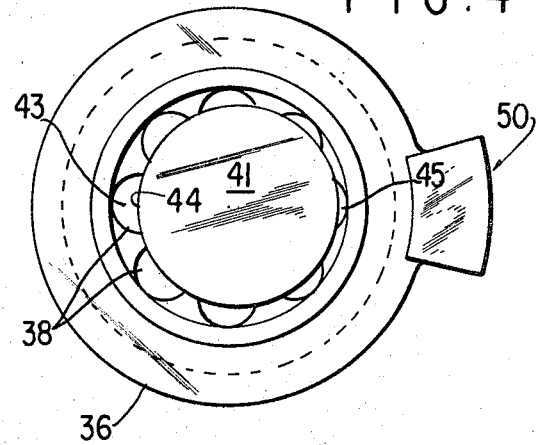
FIG. 4
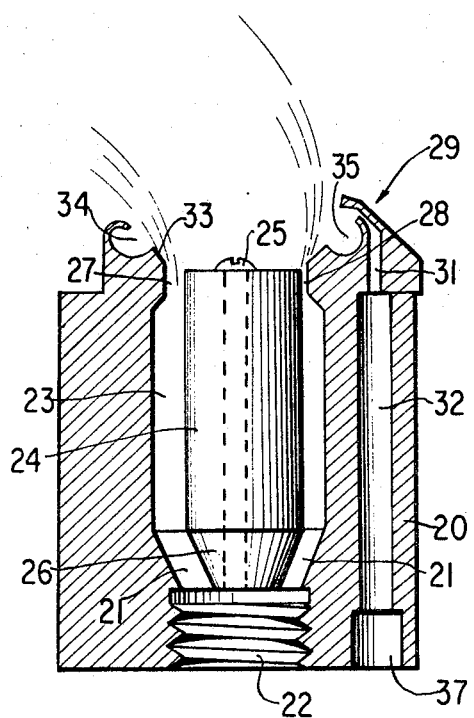
FIG. 1
FIG. 3
INVENTOR
RAYMOND N. AUGER
BY
Smythe & Moore
ATTORNEYS

INVENTOR
RAYMOND N. AUGER
BY
ATTORNEY

United States Patent Office 3,422,666
Patented Jan. 21, 1969

3,422,666
PROXIMITY DETECTION DEVICE
Raymond N. Auger, New York, N.Y., assignor, by mesne assignments, to Cutler Controls, Inc., Berwyn, Pa., a corporation of Pennsylvania
Filed Dec. 21, 1967, Ser. No. 692,556
U.S. Cl. 73—37.5   11 Claims
Int. Cl. G01b 13/08

ABSTRACT OF THE DISCLOSURE

A device for detecting proximity to a surface by use of a diverging annular-like flow producing orifice means directed toward a surface there being a signal sensing means adjacent the outside of the jet formed by the orifice, proximity of a surface to the jet disturbing the flow to produce a signal.

---

This invention relates to fluidic object detectors for determining the presence of a surface or object.

The detection of the presence of an object at a given position has been accomplished by various means in the prior art. As an example, photocells and lamp beam combinations, magnetic proximity switches and direct contact with a snap-action switch have been used. Also, air gauging apparatus using back pressure signals wherein flow through an orifice is affected by an adjacent surface have been employed. All of these devices have various drawbacks.

One solution is shown in copending application Ser. No. 637,782, filed May 11, 1967.

One of the objects of the invention is to provide a fluidic proximity detector which is sensitive and is simple in construction.

Another of the objects of the invention is to provide a proximity or object detector which has bistable characteristics.

Another of the objects of the invention is to provide a proximity sensor to indicate distance from a surface or object over a greater distance than possible with prior devices.

In one aspect of the invention, a jet is produced by a nozzle means which may be circular, interrupted, square or other forms to produce an annular-like fluid flow. A signal or sensing means is located at the exterior of the jet which will provide a signal when the flow is disturbed by the presence of a surface.

These and other objects, advantages and features of the invention will become apparent from the following description and drawings which are merely exemplary.

In the drawings:

FIG. 1 is a vertical sectional view of one form of the invention;

FIG. 2 is a top plan view of FIG. 1;

FIG. 3 is a vertical sectional view of another form of the invention;

FIG. 4 is a top plan view of FIG. 3;

Figure 9:
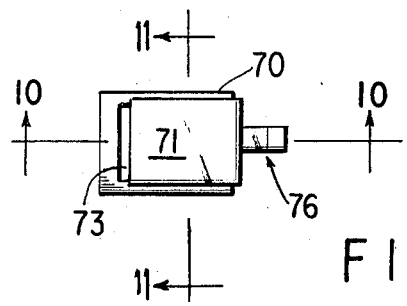
FIG. 9 is a top view of still a further form of the invention.
Figure 10:
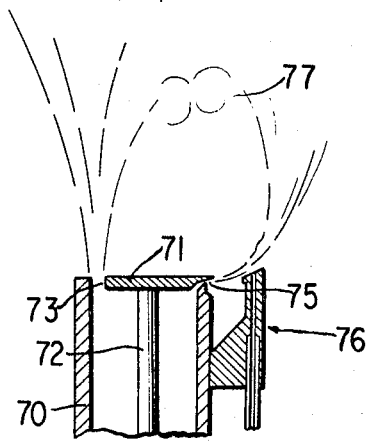
Figure 11:
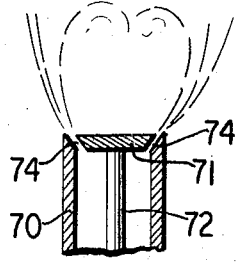
Figure 12:
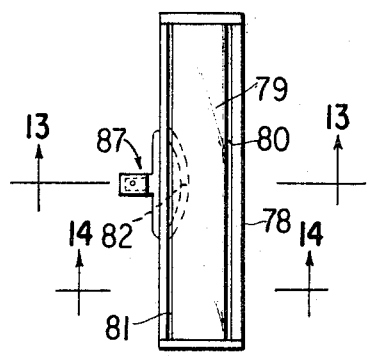

FIGS. 10 and 11 are fragmentary vertical sections of FIG. 9 taken along the lines 10—10 and 11—11 respectively;

FIG. 12 is the top view of a further modification of the invention; and

Figure 13:
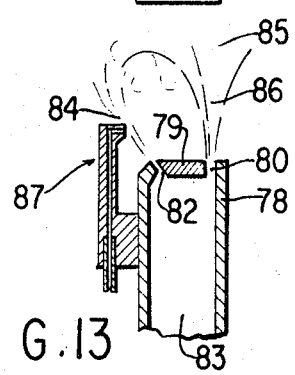
Figure 14:
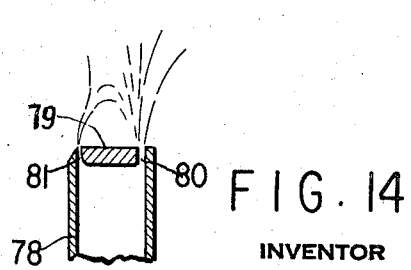

FIGS. 13 and 14 are fragmentary vertical sections of FIG. 12 taken along the lines 13—13 and 14—14 respectively.

Referring to FIG. 1, body 20 of suitable material has a plurality of holes 21 leading from the input pressure passage 22 to the cylindrical passage 23. The cylindrical-like passage is formed by the offset cylinder 24 adjustably held in position by screws 25 on the bridge 26 or other similar means. The left side 27 (FIGS. 1, 2) of passage 23 is wider than the right side 28 (FIGS. 1, 2) of said passage 23. Signal sensing slot 29 is fastened to body 20 by screws 30. The signal sensing slot or collection means 29 is connected by passage 31 to signal passage 32.

As fluid flow or jet exits from the nozzle, it follows surface 33 because of the coanda effect forming a vortex at 34.

The narrow part of the stream from side 28 is deflected towards the thicker part flowing from side 27. The presence of an object in the center of the converging stream causes at least a portion of the narrow part of the stream to deflect, so that only part of the stream is collected by the sensing means at collection slot 35 which is adjacent the outside of the annular-like jet. The collection slot 35 which acquires the deflected flow of the deflected portion of the stream as shown in FIG. 2 indicates that only about 10° to 20° of the stream is collected thereby. Air flow or pressure observed at slot 35 is transmitted by the passages 31, 32 to the port 37 at the base of the unit. Presence of an object adjacent to the jet will change the flow which, as described in the aforementioned copending application, will provide bistable signal characteristics.

Another form is seen in FIGS. 3 and 4 wherein body 36 has a main inlet port 37 directing fluid flow through holes 38 in the nozzles center structure. Cylindrical member 39 extends upwardly from base 40, the upper portion 41 being offset or eccentric relative to passage 42. Because of the coanda effect, the flow through portion 43 of the passage will follow the surface 44 of the cylindrical portion 41. On the other side of the nozzle, the narrower portion 45 causes the flow therethrough to stick to surface 46 and to follow around the bevel face 47 and then enter collection slot 48 when an object causes deflection of the annular-like jet. The collected pressure at 48 will affect pressure in signal passage 49. The collection or signal sensing means at 50 is adjacent the exterior of the annular-like fluid flow jet stream.

Figure 6:
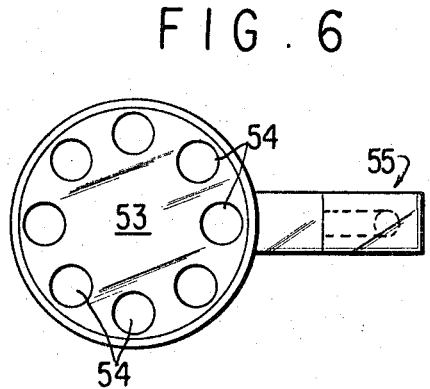
FIG. 6 is a top plan view of FIG. 5.
Figure 5:
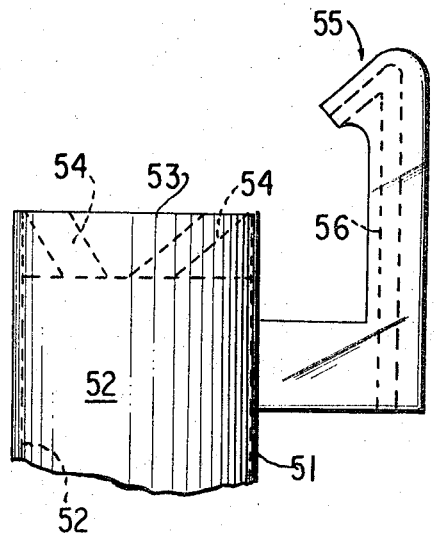
FIG. 5 is a fragmentary view of another form of the invention.

A still further form is seen in FIGS. 5 and 6 wherein body 51 has fluid fed thereto through passage 52. Plug 53 has a series of inclined passages 54 therearound. The apertures do not necessarily need to be of the same diameter or spacing nor does the angle of divergency have to be the same. The apertures also could be oblong, square, rectangular, etc. The signal collector 55 has a signal passage 56 similar to the previous forms. The passages 54 can be formed to provide a wider portion at the left hand side (FIG. 5) of the jet and at a smaller angle to the vertical or longitudinal axis as compared to the right hand (FIG. 5) side. The flow through the apertures will produce an annular-like-jet which will join as it recedes from the nozzle and which will be deflected by the proximity of an object.

Figure 8:
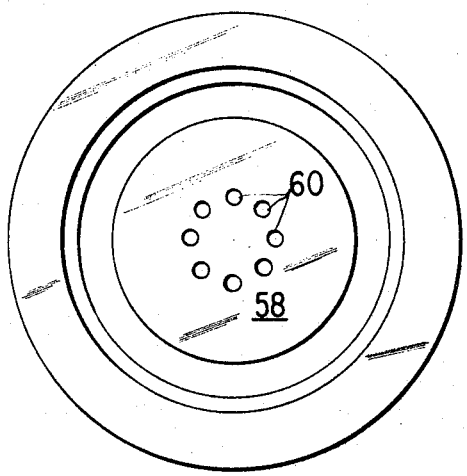
FIG. 8 is a top plan view of FIG. 7.
Figure 7:
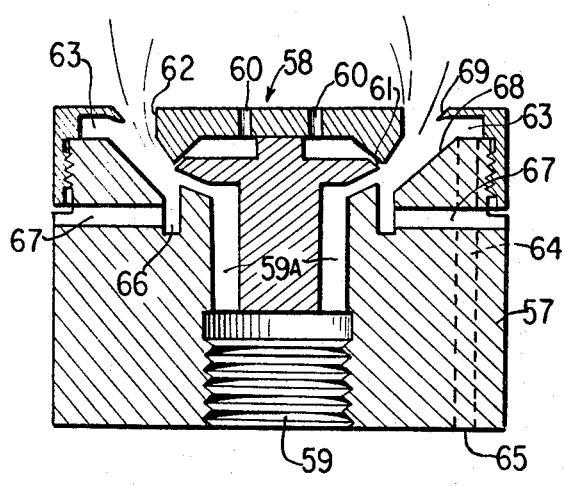
FIG. 7 is a vertical sectional view of still another form of the invention.

FIGS. 7 and 8 show still a further arrangement of the invention. Body 57 has a center cone 58 with the fluid input connection at 59.

The power stream coming up from the power inlet connection at 59 through aperture 59A hugs the surface of the semisphere 58 and enters the atmosphere with a tubular shape. There will be some stream attraction, giving the stream a focused tendency and a subatmospheric center, which, entering the ports 60, will cause a subatmospheric center at annular control slot 61. When an object breaks into the projected stream such as to raise the pressure in the center thereof, the rise in pressure will lessen the attraction of the power stream by the semisphere because of the rise in pressure at the slot 61. The stream tends to separate from the semisphere 50 rather than follow it to its lip 62, and consequently, part of the deflected stream now enters annular slot 63. A passage 64 from slot 63 carries the change in pressure resulting from the deflection of the power stream to an output port 65. The annular slot 66 is connected to the atmosphere by passages 67 which minimizes the tendency of the stream to stick to the surfaces 68, 69. It should be apparent that only part of the structure needs to have the amplifier arrangement shown in FIGS. 7 and 8 as a full 360° expression. Furthermore, it could be made so that the structure of FIGS. 7 and 8 might be hexagonal or square.

Variations of the structure illustrated in FIGS. 7 and 8 can be made to create special effects. For example, atmospheric vent passage 67 can be either negatively or positively biased to make the unit bistable, under one set of conditions, or to keep it from becoming bistable, under another set of conditions.

In the form shown in FIGS. 9, 10 and 11, body 70 has a central portion 71 supported on central member 72. The central member 71 is offset so as to provide a slot 73 which is wider than the slots at 74 and 75. Collection or signal sensing member 76 is similar to and operates in a manner following that of the previously described forms. The jet 77 is annular-like in form following generally that previously described.

A parallel slot arrangement is depicted in FIGS. 12, 13 and 14 wherein body 78 has a central portion 79. Slot 80 is wider than slot 81. The slot 81 is angled at the center portion 82 thereof as compared to the slot configuration either side thereof. Fluid passing through input 83 will be deflected outwardly at 84 to form an annular-like jet at 85 in conjunction with flow at 86. As the jet flow recedes from the sensor it will tend to come together to form a complete annular-like jet or bloom. Upon deflection thereof by the presence of an object, a signal will be collected by the signal sensing means 87 in a manner similar to the previously described devices.

It should be apparent that changes may be made in details of construction without departing from the spirit of the invention except as defined in the appended claims.

What is claimed is:

1. In an object detecting device, the combination including body means, divergent annular-like fluid flow producing nozzle means carried by said body means and producing an output fluid flow zone, and signal collecting orifice means exterior of said output zone towards which flow from said nozzle means is directed when an object disturbs the mutual attraction of portions of said steam, introduction of an object to be detected into the stream disturbing the mutual attraction effect of at least part of the stream relative to the remainder of the stream causing an increase in pressure at the signal collecting means.

2. A device as in claim 1 wherein the body means has an offset central member for producing a fluid flow jet which has thin and wide flow stream portions.

3. A device as in claim 2 wherein said orifice means is located in a restricted area adjacent the thinner portion of the output fluid flow stream.

4. A device as in claim 2 wherein the central member has a beveled upper face.

5. A device as in claim 1 wherein the nozzle means has a spherical-like undersurface.

6. A device as in claim 5 wherein the central member has passages leading from its outer surface to passages between said central member and said orifice means.

7. A device as in claim 6 wherein the passage between said central member has connection passage means to the exterior of the body means.

8. A device as in claim 1 wherein the nozzle means comprises a plurality of apertures.

9. A device as in claim 8 wherein the nozzle means are arranged to provide a wider jet flow on the side away from said orifice means.

10. A device according to claim 2 wherein the central member is rectangular in shape.

11. A device according to claim 2 wherein the central member provides one wide slot and one narrower slot, the narrower slot being adjacent the orifice means.

References Cited

UNITED STATES PATENTS 3,371,517  3/1968  Roth _____ 73—37.5

S. CLEMENT SWISHER, *Primary Examiner.*

W. HENRY II, *Assistant Examiner.*